(No Model.)
T. B. BLOSSER.
VEHICLE TIRE.
No. 543,434.  Patented July 23, 1895.
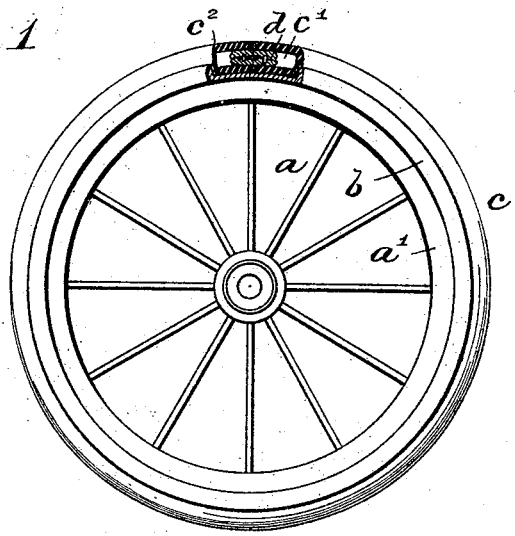
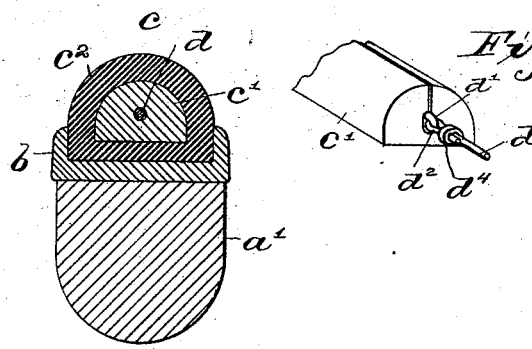
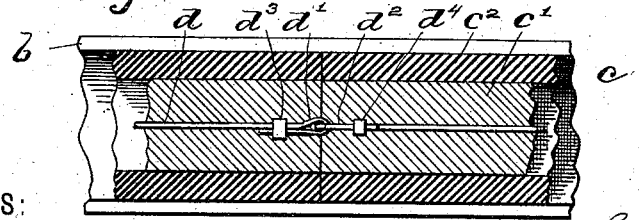
WITNESSES:
G. M. Gridley
Chas. I. Welch
INVENTOR
Theodore B. Blosser
BY Paul A. Stahy
ATTORNEY

UNITED STATES PATENT OFFICE.

THEODORE B. BLOSSER, OF SPRINGFIELD, OHIO, ASSIGNOR, BY DIRECT AND MESNE ASSIGNMENTS, TO THE VICTOR RUBBER TIRE COMPANY, OF SAME PLACE.

VEHICLE-TIRE.

SPECIFICATION forming part of Letters Patent No. 543,434, dated July 23, 1895.

Application filed May 24, 1895. Serial No. 550,548. (No model.)

*To all whom it may concern:*

Be it known that I, THEODORE B. BLOSSER, a citizen of the United States, residing at Springfield, in the county of Clark and State of Ohio, have invented certain new and useful Improvements in Vehicle-Tires, of which the following is a specification.

My invention relates to improvements in that class of rubber tires designed for ordinary vehicle-wheels.

The object of my invention is to provide a tire of simple and inexpensive construction which shall be durable as well as effective in operation.

My invention consists in the various constructions and combinations of parts, hereinafter described, and set forth in the claims.

In the accompanying drawings, Figure 1 is a side elevation of a vehicle-wheel, to which my invention is shown applied, a part of the tire and felly being shown in section. Fig. 2 is a transverse sectional view of the wheel-rim with the tire thereon. Fig. 3 is a top view of the felly with the tire shown in section. Fig. 4 is a detail view showing a modification.

Like parts are represented by similar letters of reference in the several views.

In the said drawings, $a$ represents an ordinary vehicle-wheel, $a'$ the rim thereof, and $b$ the metal felly or channel-iron into which my improved rubber tire is placed, these being the usual and common constructions.

My improved tire $c$ consists, essentially, of an inner core $c'$, of leather or other suitable flexible material having little or no elasticity, said inner core being surrounded by a coating or casing $c^2$, of rubber. The inner core is provided with a perforation extending longitudinally through the same and through which is passed a retaining-wire $d$.

In placing the tire on the wheel the ends of the tire are brought together and the ends of the wire united by forming the same into loops $d'$ and $d^2$, which interlock, as shown in Fig. 3, the ends of the wire forming the loops being held by small sleeves or collars $d^3$ $d^4$, passed over the same, as shown. In uniting the ends of the wire the rubber casing or coating is pressed back along the core, and if the core cannot be compressed sufficiently endwise the same may be slit at the ends, as shown in Fig. 4, to permit the uniting of the wires, after which the core is closed over the joint thus formed, and the elasticity of the rubber coating or casing will cause the ends thereof to press firmly together, and, if desired, they may be further united by cementing the same in a well-known manner.

This tire may be formed by providing the core and molding the rubber around the same, or the rubber may be formed hollow and the core drawn through the same after the rubber is completed. The tire is preferably flat at the bottom to fit the channel-iron or metal felly, the core being correspondingly shaped. By employing the central core of leather or similar non-elastic or slightly-elastic material two very important results are accomplished. The tire is very materially cheapened without materially affecting its efficacy or its durability. The retaining-wire passing through the core is brought in contact with a harder substance than when in direct contact with the rubber and is not so liable to cut through or to enlarge the opening. By having the bottom of the core flat a single retaining-wire placed centrally through the same will, through the medium of the core, exert a retaining pressure over almost the entire bottom of the tire and thus dispense with the necessity of additional retaining-wires.

Having thus described my invention, I claim—

1. The combination in a vehicle wheel having a channel felly, of a tire consisting essentially of a rubber body having a continuous opening through the same, a continuous core of leather or other similar nonelastic or slightly elastic material adapted to fit in said opening so as to form a substantially solid tire, and a retaining wire passing through said core, substantially as specified.

2. The combination with a vehicle wheel having a channel felly, of a rubber-tire having a flat bottom to fit said felly, a central core of leather or other similar non-elastic or slightly elastic material also flat at the bottom as described, and a single retaining wire passing through said core, substantially as specified.

3. The combination with a channel felly, of a rubber-tire having a central core of leather, a retaining wire passing through said core, the ends of said retaining wire being united by interlocking loops having retaining sleeves or collars, substantially as specified.

In testimony whereof I have hereunto set my hand this 16th day of May, A. D. 1895.

THEODORE B. BLOSSER.

Witnesses:
OLIVER H. MILLER,
CHAS. I. WELCH.